United States Patent [19]

Colwell et al.

[11] Patent Number: 4,505,031

[45] Date of Patent: Mar. 19, 1985

[54] METHOD OF ASSEMBLING AN ELECTRIC MOTOR

[75] Inventors: Robert Colwell; Robert J. Bartell, both of Owosso, Mich.

[73] Assignee: Universal Electric Company, Owosso, Mich.

[21] Appl. No.: 425,410

[22] Filed: Sep. 28, 1982

[51] Int. Cl.³ .............................................. H02K 15/16
[52] U.S. Cl. ..................................................... 29/596
[58] Field of Search ........................ 29/596, 598, 732; 310/42, 89, 51, 258, 157, 66, 67 R, 85; 362/96; 416/5

[56] References Cited

U.S. PATENT DOCUMENTS

| Re. 28,075 | 7/1974 | Kavanaugh | 310/67 R |
|---|---|---|---|
| 2,829,287 | 4/1958 | Soler Font | 310/67 R |
| 3,050,832 | 8/1962 | Scheldorf | 29/596 |
| 3,899,702 | 8/1975 | Hanna et al. | 310/67 R |

*Primary Examiner*—Howard N. Goldberg
*Assistant Examiner*—P. W. Echols
*Attorney, Agent, or Firm*—Barnes, Kisselle, Raisch, Choate, Whittemore & Hulbert

[57] ABSTRACT

The method of assembling an electric motor which comprises forming an upper housing assembly by first forming a generally cylindrical shell, forming an end member with an axial tube, mounting the end member on the cylindrical shell with the tube extending axially inwardly, locating the shell radially in an accurate position with respect to the axis of the shell, fastening the end member to the shell to form an upper housing assembly, mounting a radial wall on a hollow shaft, accurately locating a stator on the radial wall so that the stator and the outer diameter of the shaft are in accurate concentric relationship, fixing the stator in this accurate position to form a lower housing assembly, telescoping the upper assembly over the shaft of the lower housing assembly and interposing bearings between the shaft and the tube so that the upper housing assembly is in accurate concentric relationship with the stator.

5 Claims, 9 Drawing Figures

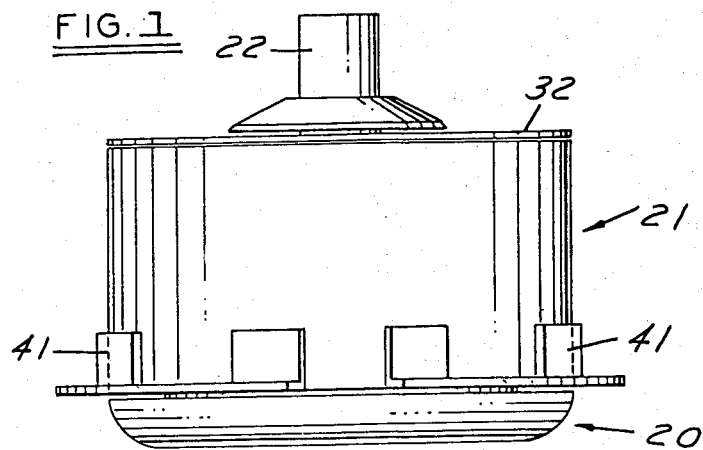
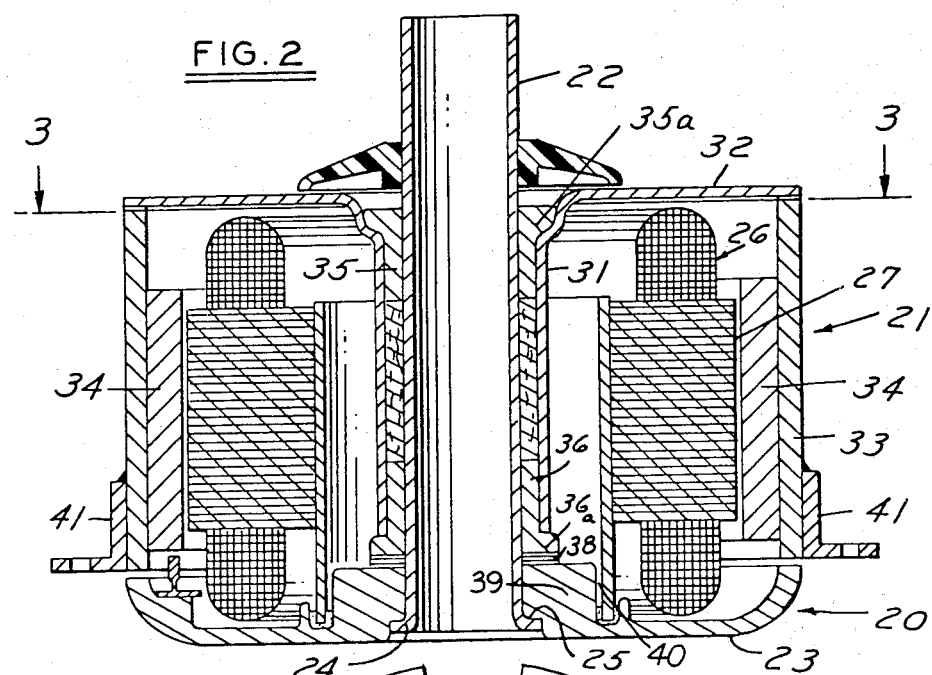
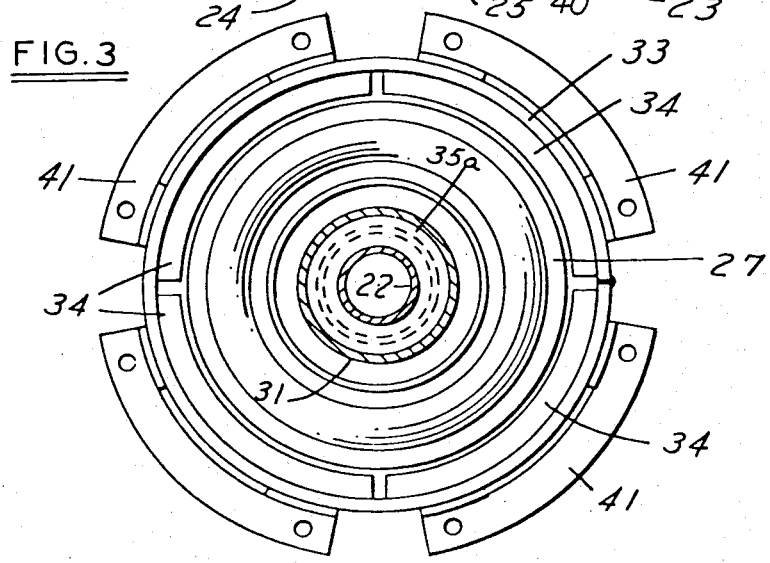

METHOD OF ASSEMBLING AN ELECTRIC MOTOR

This invention relates to electric motors.

BACKGROUND AND SUMMARY OF THE INVENTION

In the manufacture of electric motors, a basic requirement for high efficiency and low noise is that the air gap between the rotor and stator be maintained within predetermined limits. However, assembly methods for motors often are such that the tolerances do not assure a precise final construction of the motor.

Further in certain types of motors such as used for ceiling fans, it is required to have a conduit extending through the rotating shaft of the motor in order that wiring may be provided to controls and light fixtures suspended from the motor.

Accordingly, among the objectives of the present invention are to provide an electric motor and a method of making and assembling the motor wherein the accumulation of tolerances which would detract from the efficiency and would produce noise are minimized; wherein the motor has a minimum number of parts and can be utilized for ceiling fan operations which require a hollow conduit through which wires may be provided.

In accordance with the invention, the electric motor comprises a lower housing assembly and an upper housing assembly. The lower housing comprises a hollow stationary shaft, a bottom plate mounted on the shaft and a stator mounted on the bottom plate. The upper housing comprises a tube and an integral top plate and a rotor mounted on the plate. The tube of the upper housing assembly is telescoped over the shaft of the lower housing assembly and bearings between the tube and shaft rotatably support the rotor about the stator.

The method of assembling an electric motor comprises forming an upper housing assembly by first forming a generally cylindrical shell, forming an end plate with an axial tube, mounting the end plate on said cylindrical shell with the tube extending axially inwardly, locating the shell radially in an accurate position with respect to the axis of the shell, fastening the end member to the shell to form an upper housing assembly, mounting a radial wall on a hollow shaft, accurately locating a stator on the radial wall in accurate concentric relationship between the stator and the outer diameter of the shaft, fixing the stator in this accurate position to form a lower housing assembly, telescoping the upper housing assembly over the shaft of said lower housing assembly and interposing bearings between the shaft and the tube so that the rotor is in accurate concentric relationship with the stator.

DESCRIPTION OF THE DRAWINGS

FIG. 1 is an elevational view of an electric motor made in accordance with the invention.

FIG. 2 is a vertical sectional view of the electric motor.

FIG. 3 is a sectional view taken along the line 3—3 in FIG. 2.

DESCRIPTION

Figure 4:
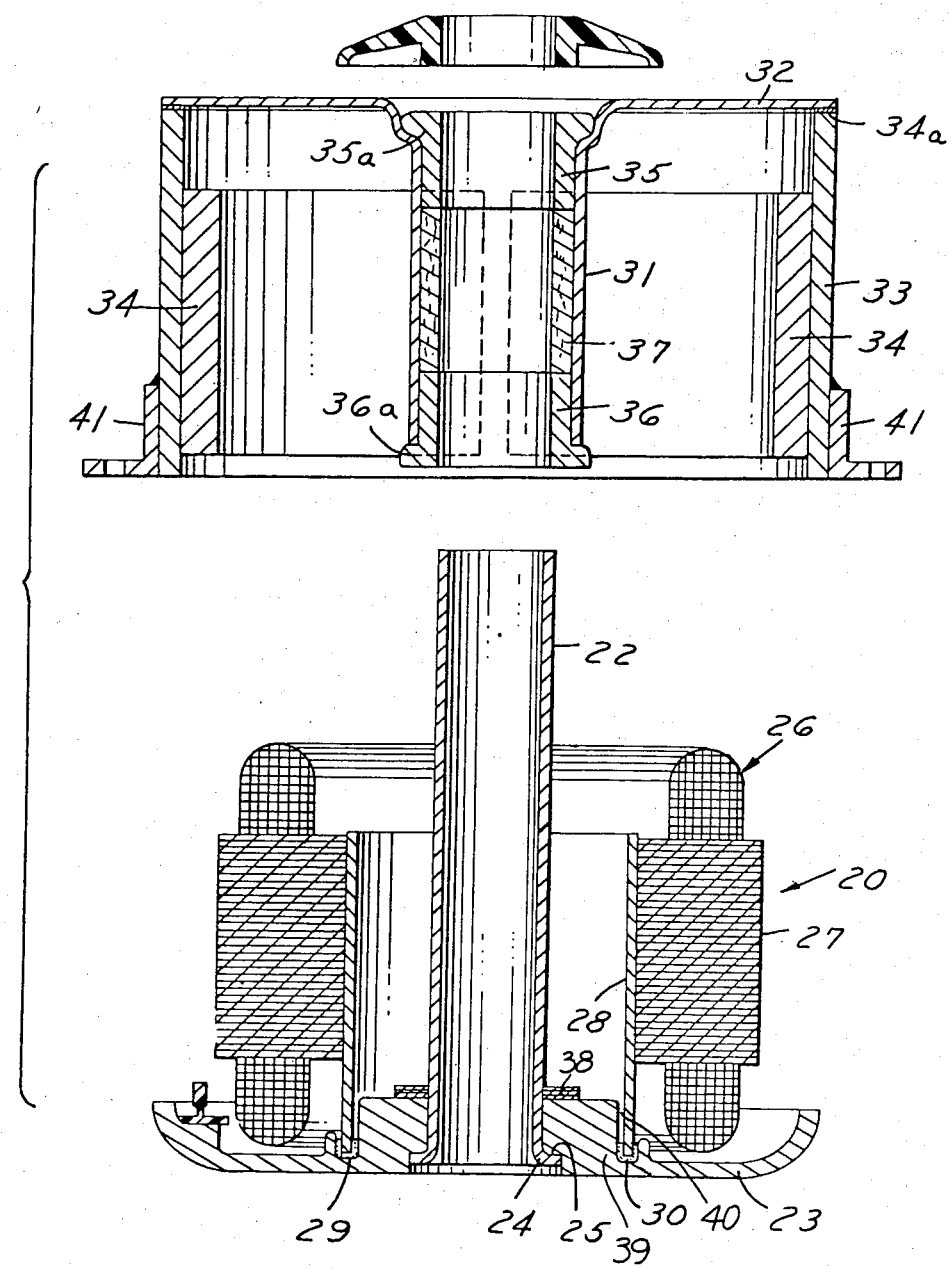
FIG. 4 is an exploded view of the upper and lower housing assemblies comprising the electric motor.

Referring to FIGS. 1–4, the motor embodying the invention comprises a lower housing assembly 20 and an upper housing assembly 21. The lower housing assembly 20 consists of a stationary hollow shaft 22 that has an accurate outer diameter provided by machining or grinding fixed to a radial wall or bottom plate 23 by flaring the lower end as at 24 and interposing adhesive 25 between the flared end 24 and a corresponding surface of the wall 23. A stator 26 is accurately positioned in concentric relationship to the outer diameter of the shaft 22 and comprises a stator winding 27 fixed to the outer surface of an annular wall 28, the lower end of which extends into an upwardly facing groove 29 in wall 23. Sealing means 30 in the form of adhesive holds the annular wall 28 and, in turn, the stator 26 in accurate concentric relation with respect to the shaft 22.

The upper housing assembly 21 comprises a tube 31 with an integral radial flange 32 defining a wall or top plate and a cylindrical shell 33 adhered as at 34 at its upper end to the periphery of the wall 32 in accurate concentric relationship to the inner diameter of the tube 31. The inner wall of the shell 33 is provided with a plurality of magnets 34 that define the rotor of the motor herein shown and described as a permanent magnet brushless d.c. motor. Although the construction is described with respect to such a motor it can also be utilized with respect to other type motors such as shaded pole motors.

Sleeve bearings 35, 36 are interposed between the shaft 22 and the tube 31. Felt 37 impregnated with oil is provided between the bearings and a flat thrust washer 38 is provided between the lower bearing 36 and the hub 39 of the member 23. Each bearing 35, 36 is provided with a flange 35a, 36a. Flange 36a engages the lower free end of tube 31.

In operation, as the upper housing assembly 21 rotates relative to the lower housing, assembly 20 and the motor heats up, the oil passes downwardly from felt 37 and accumulates in the area 40 between the wall 28, wall 23 and tube 31 to lubricate the thrust bearings. However, oil is prevented from leaking by the seal formed by the sealent 30 and the seal between the flange 24 and the member 23.

Brackets 41 are provided at circumferentially spaced points on the periphery of shell 33 for mounting fan blades where the motor is to be utilized for a ceiling fan. The hollow shaft 22 provides a passage for wiring to extend downwardly to the controls and light fixtures (not shown) which may be mounted on the wall 23. The hollow shaft 22 also functions as a means of supporting the electric motor and controls, light fixtures mounted thereon.

Figure 6:
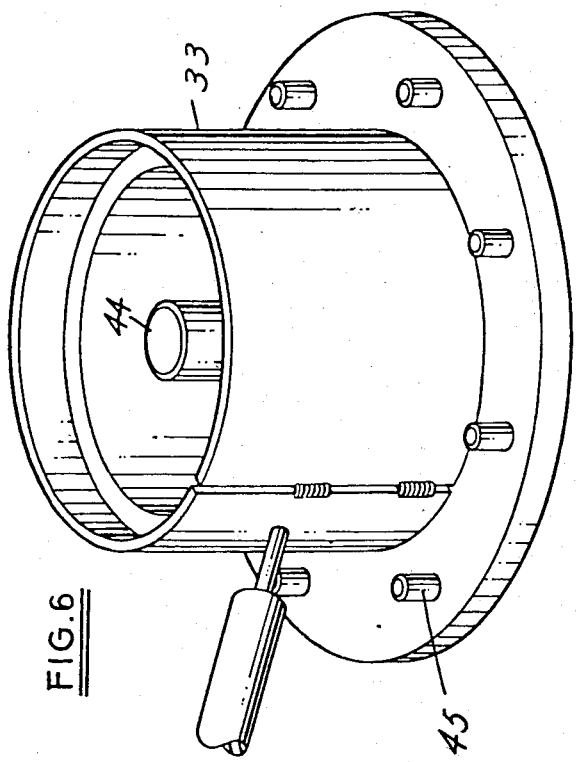
FIGS. 5–8 are perspective views showing steps in the making of the upper housing assembly.
Figure 8:
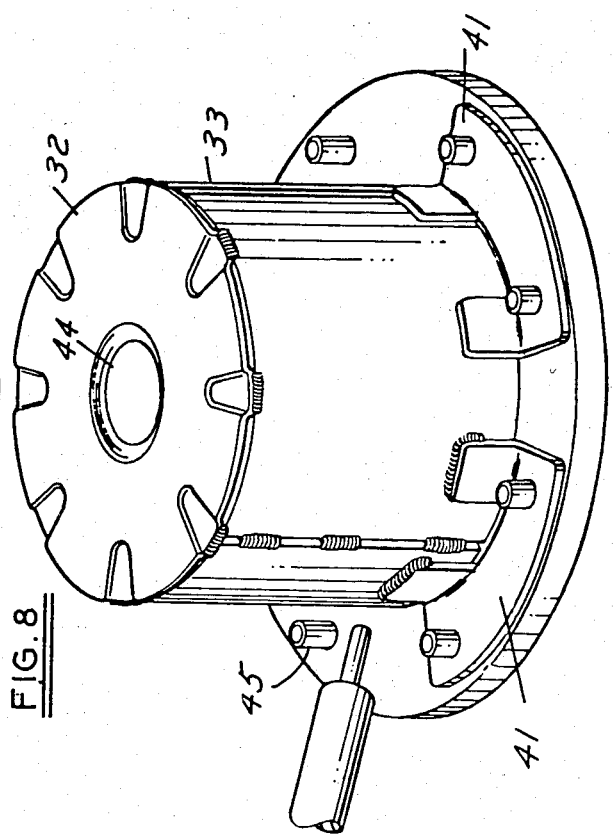
Figure 5:
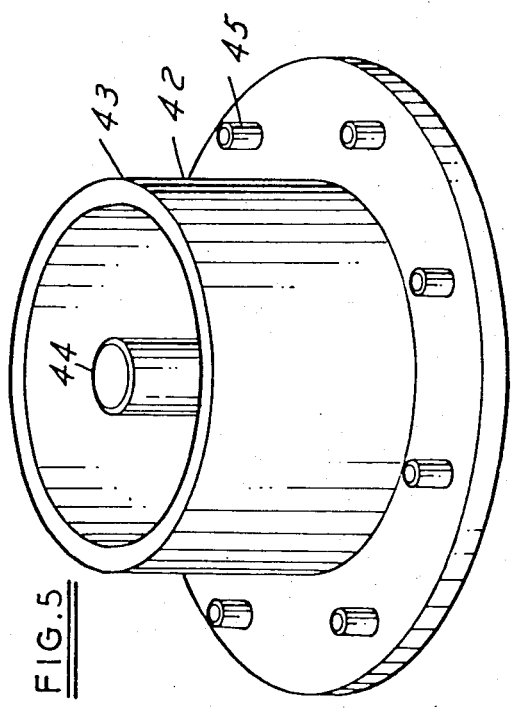
Figure 7:
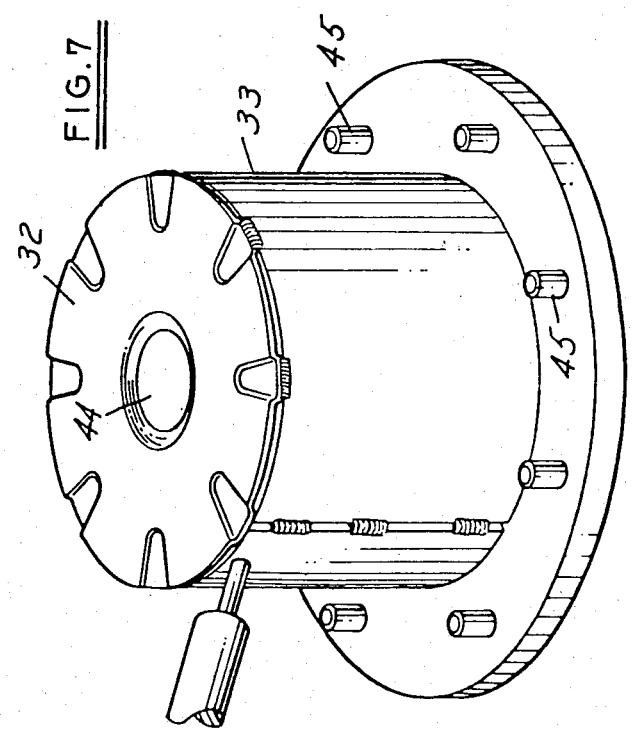

The upper housing assembly is assembled by utilizing a fixture 42 such as shown in FIG. 5. The shell 33 in the form of a rectangular blank rolled into a cylinder is first supported on the cylinder 43 of the fixture 42 and the ends of the shell are welded to define an accurate cylinder (FIG. 6). The top plate 32 with the tube 31 and bearings 35, 36 and felt 37 thereon is positioned on the cylinder, the tube 31 being guided by a guide member 44 that is concentric with the outer diameter of the cylinder 43 of the fixture 42 and the top plate 32 is then welded on the shell 33 (FIG. 7). Finally, brackets 41 are located on guide pins 45 accurately positioned with respect to cylinder 42 and guide 44 to accurately position them with respect to the shell 33 and they are then welded to the shell 33 (FIG. 8).

Figure 9:
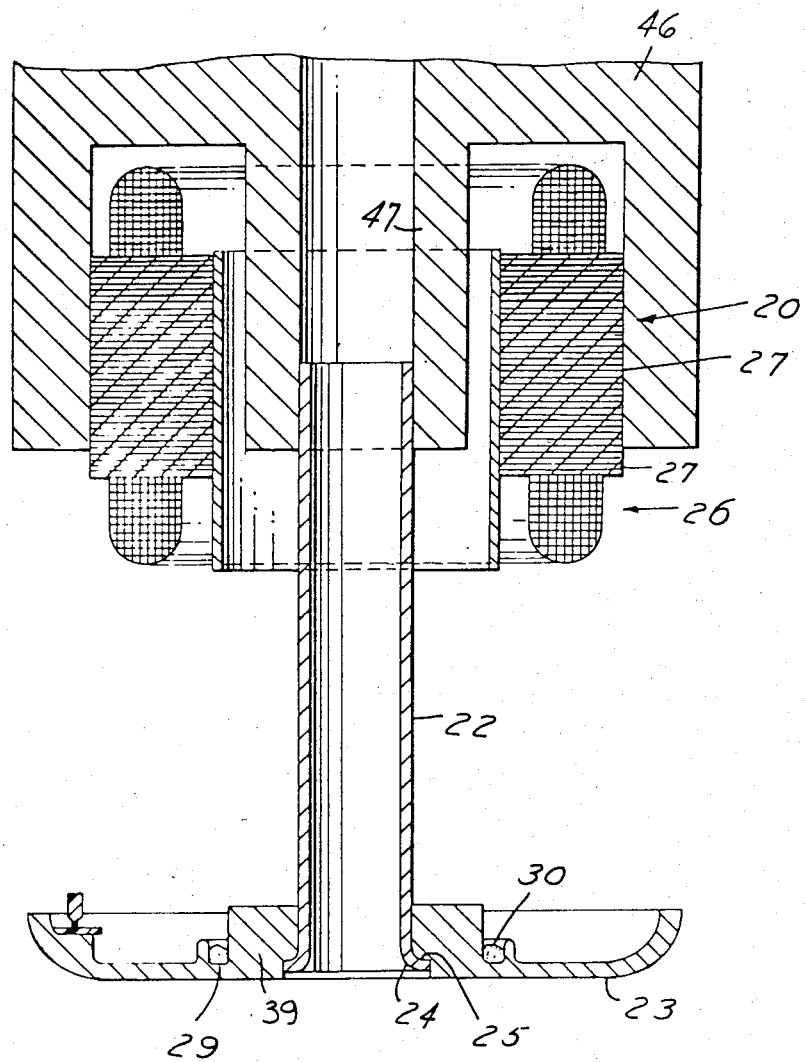
FIG. 9 is a view showing a step in making the lower housing assembly.

Referring to FIG. 9, the lower housing assembly 20 is assembled by mounting the tube 22 on the member 23 and then supporting it on a fixture 46 with a guide tube 47 engaging the accurately formed exterior of the tube 22. The fixture 46 also receives the stator 26. As the fixture 46 is moved along the shaft tube 22 the stator is held in concentric relationship to the outer diameter of the stator and guided axially of the shaft 22 to bring wall 28 into groove 29 into which the adhesive 30 has been placed. The fixture is held stationary until the adhesive sets.

The upper and lower housing assemblies 20, 21 are then assembled by first placing the thrust washer in position on the hub, and then telescoping the upper housing assembly 21 and lower housing assembly 20 axially to bring them into assembled relationship.

We claim:

1. The method of assembling an electric motor which comprises forming a rectangular blank into a cylinder,
placing the blank on a cylindrical fixture,
fastening the adjacent ends of the blank to one another to provide a cylindrical shell having an internal diameter conforming to the external diameter of the cylindrical fixture,
providing a top plate with a first cylindrical axial tube,
providing bearings in the tube,
placing the top plate with the first axial tube on the open end of the shell on the fixture with the bearing members engaging a guide member on the fixture which is concentric with the cylinder of the fixture,
fastening the top plate to the top of the shell to provide an upper housing assembly,
securing a second cylindrical axial tube on a radial wall,
supporting a stator with an annular wall on the internal surface of said stator within a second fixture having an opening for receiving the second tube,
moving the stator and annular wall toward the radial wall,
guiding the stator by interengagement of the second tube with the guide opening in the second fixture to maintain the second tube in concentric relationship and bring the annular wall into a groove in the radial wall,
securing the annular wall to said radial wall to provide a lower housing assembly,
thereafter placing a thrust washer in position on the second tube in engagement with the radial wall of the lower housing assembly and telescoping the upper and lower housing ssemblies bringing the second axial tube axially through the bearings in the first tube.

2. The method set forth in claim 1 including the step of providing mounting brackets on locating pins on said fixture positioned in concentric relation to the cylinder of the fixture and fastening said brackets to said shell such that the brackets are in accurate position about the periphery of said shell, prior to assembly of said upper housing assembly on said lower housing assembly.

3. The method of making an upper housing assembly for an electric motor which comprises forming a rectangular blank into a cylinder,
placing the blank on a cylindrical fixture,
fastening the adjacent ends of the blank to one another to provide a cylindrical shell having an internal diameter conforming to the external diameter of the cylindrical fixture,
providing a top plate with a first cylindrical tube,
placing bearings in the tube,
placing the top plate with the first tube on the open end of the shell on the fixture with the bearing members engaging a guide member which is concentric with the cylinder of the fixture,
fastening the top plate to the top of the shell to provide an upper housing assembly.

4. The method set forth in claim 3 including the step of providing mounting brackets on locating pins on said fixture positioned in concentric relation to the cylinder of the fixture and fastening said brackets to said shell such that the brackets are in accurate position about the periphery of said shell.

5. The method of making a lower housing assembly for an electric motor which comprises securing a cylindrical axial tube on a radial wall,
supporting a stator with an annular wall on the internal surface of said stator within a fixture having an opening for receiving the axial tube,
moving the stator and annular wall toward the radial wall,
guiding the stator by interengagement of the axial tube with the guide opening in the fixture to maintain the axial tube in concentric relationship with the annular wall and bring the annular wall into a groove in the radial wall and securing the annular wall to said radial wall to provide a lower housing assembly.

* * * * *